(12) United States Patent
Liu et al.

(10) Patent No.: US 7,685,137 B2
(45) Date of Patent: Mar. 23, 2010

(54) TECHNIQUE OF USING XMLTYPE TREE AS THE TYPE INFRASTRUCTURE FOR XML

(75) Inventors: Zhen Hua Liu, San Mateo, CA (US);
Muralidhar Krishnaprasad, Fremont, CA (US); Vikas Arora, San Francisco, CA (US); James W. Warner, Mountain View, CA (US); Anand Manikutty, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 664 days.

(21) Appl. No.: 11/044,472

(22) Filed: Jan. 26, 2005

(65) Prior Publication Data

US 2006/0031233 A1 Feb. 9, 2006

Related U.S. Application Data

(60) Provisional application No. 60/599,319, filed on Aug. 6, 2004.

(51) Int. Cl.
*G06F 7/00* (2006.01)
(52) U.S. Cl. ....................................... 707/100
(58) Field of Classification Search ................... 707/100
See application file for complete search history.

(56) References Cited

U.S. PATENT DOCUMENTS

| 5,717,911 | A | 2/1998 | Madrid et al. |
| 6,356,887 | B1 | 3/2002 | Berenson et al. |
| 6,356,889 | B1 | 3/2002 | Lohman et al. |
| 6,516,327 | B1 | 2/2003 | Zondervan et al. |
| 6,536,889 | B1 | 3/2003 | Biegelsen et al. |
| 6,836,778 | B2 * | 12/2004 | Manikutty et al. .......... 707/102 |
| 7,013,311 | B2 | 3/2006 | Hui et al. |
| 7,028,028 | B1 | 4/2006 | Balmin et al. |
| 7,031,956 | B1 | 4/2006 | Lee et al. |
| 7,099,858 | B2 | 8/2006 | Aldrich et al. |

(Continued)

FOREIGN PATENT DOCUMENTS

WO    WO 01/42881 A    6/2001

(Continued)

OTHER PUBLICATIONS

Oracle Corporation, Oracle 9i XML Database Developer's Guide—Oracle XML DB, Relase 2 (9.2) Mar. 2002, pp. 1-908.*

(Continued)

*Primary Examiner*—Cheyne D Ly
(74) *Attorney, Agent, or Firm*—Hickman Palermo Truong & Becker LLP; Adam C. Stone (57) ABSTRACT

A universal format is used to create a type representation of XMLType instances that are generated in various ways from various sources. An XMLType Type Tree is represented as a hierarchy of nodes, including leaf item node, composite item node, operator node, aggregate node, referred to herein as an XMLType Type Tree. An XMLType Type Tree serves as a digest of the type structure of XMLType, no matter the source of the XMLType instance or its manner of its generation and it creates one uniform abstraction of the type structure of XMLType for the data-typing analysis of XPath and XQuery during query compile time.

32 Claims, 6 Drawing Sheets

U.S. PATENT DOCUMENTS

| | | | |
|---|---|---|---|
| 7,167,848 | B2 | 1/2007 | Boulkouvalas et al. |
| 7,359,922 | B2 | 4/2008 | Young-Lai et al. |
| 2002/0073019 | A1 | 6/2002 | Deaton |
| 2002/0087510 | A1 | 7/2002 | Weinberg et al. |
| 2002/0116457 | A1 | 8/2002 | Eshleman et al. |
| 2003/0028561 | A1* | 2/2003 | Gounares et al. ............ 707/513 |
| 2003/0033285 | A1 | 2/2003 | Jalali et al. |
| 2003/0140308 | A1* | 7/2003 | Murthy et al. .............. 715/500 |
| 2003/0154204 | A1 | 8/2003 | Chen-Wright et al. |
| 2003/0212662 | A1 | 11/2003 | Shin et al. |
| 2004/0015783 | A1 | 1/2004 | Lennon et al. |
| 2004/0064466 | A1* | 4/2004 | Manikutty et al. .......... 707/100 |
| 2004/0139393 | A1* | 7/2004 | Heuer et al. ................ 715/513 |
| 2004/0148278 | A1 | 7/2004 | Milo et al. |
| 2004/0220912 | A1 | 11/2004 | Manikutty et al. |
| 2004/0220927 | A1 | 11/2004 | Murthy et al. |
| 2004/0243555 | A1 | 12/2004 | Bolsius et al. |
| 2004/0267760 | A1 | 12/2004 | Brundage et al. |
| 2005/0010896 | A1 | 1/2005 | Meliksetian et al. |
| 2005/0097084 | A1 | 5/2005 | Balmin et al. |
| 2005/0120029 | A1 | 6/2005 | Tomic et al. |
| 2005/0177578 | A1* | 8/2005 | Chen et al. .................. 707/100 |
| 2005/0210002 | A1 | 9/2005 | Pal et al. |
| 2005/0289125 | A1 | 12/2005 | Liu et al. |
| 2006/0010124 | A1 | 1/2006 | Lucas et al. |
| 2006/0101011 | A1 | 5/2006 | Lindsay et al. |

FOREIGN PATENT DOCUMENTS

| | | |
|---|---|---|
| WO | WO 03/027908 A | 4/2003 |

OTHER PUBLICATIONS

Votsch et al., Oracle XML DB: Uniting XML Content and Data, Seybold Consulting Group, pp. 1-14, 2002.*

Krishnaprasad et al., Proceedings of the 30th VLDB Conference, Toronto, Canada, 2004, pp. 1134-1145.*

Du, F., Moving from XML Documents to XML Databases, Thesis, University of British Columbia, pp. 1-42, Mar. 2004.*

Melton, J., SQLX Bringing XML and SQL Together, JISBD2001, Jornada de Ingeneria del Software y Bases de Datos, Almagro, Espana, 1-156, 2001.*

M. Levene and P. T. Wood, "XML structure compression," in Proceedings of the Second International Workshop on Web Dynamics, pp. 1-14, May 2002.*

Cooper, et al., "A Fast Index for Semistructured Data," Proceedings of the International Conference on Very Large Data Bases, 2001, pp. 341-350, XP002303292.

McHugh, Jason, et al. "Indexing Semistructured Data," Stanford Science Department, 1998, XP-002248313, pp. 1-21.

McHugh, Jason et al., "Query Optimization for XML", XP-002333353, *Proceedings of the $25^{th}$ VLDB Conference* (1999) pp. 315-326.

Peng, Feng et al., "XPath queries on streaming data", 2003, ACM Press, pp. 431-442.

Vion-Dury, Jean-Yves, "XPath on left and right sides of rules: toward compact XML tree rewriting through node patterns", 2003, ACM Press, pp. 19-25.

Gennick, Jonathan, "SQL in, XML out", May/Jun. 2003, Oracle Magazine, 5 pages, May 21, 2008.

Japanese Patent Office, "Notice of Grounds of Rejection", Patent application No. 533163/2003, mailed Aug. 19, 2008 / received Aug. 21, 2008, 7 pages.

Claims, Patent application No. 533163/2003, 9 pages.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

Leontiev, Yuri, et al., "On Type Systems for Object-Oriented Database Programming Languages", ACM computing surveys, vol. 34, No. 4, Dec. 2002, 41 pages.

* cited by examiner

```
select xmlelement(""PERSON"",
    xmlelement(""FNAME""), fname),
    xmlelement(""LNAME"", lname),
    xmlelement(""ADDR"",
        xmlelement(""STREET"", street)
        xmlelement(""ZIP"", zip)),
    (select xmlaggregate(""DEPENDENTS"",
        xmlelement(""CHILD"", child.fname))
     from child_table where child_id = p.parent.id)))
from parent_table p;
```
QX

```
<PERSON>
    <FNAME>John</FNAME>
    <LNAME>Doe</LNAME>
    <ADDR>
        <STREET>Glen Echo</STREET>
        <ZIP>95125</ZIP></ADDR>
    <DEPENDENTS>
        <CHILD>JOHNIE</CHILD>
        <CHILD>AMBER</CHILD></DEPENDENTS>
</PERSON>
```
QX RESULT

```
Create Type PERSON as Object
    (FNAME    VARCHAR(30),
     LNAME    VARCHAR(30),
     ADDR     Address_Type,
     CHILD    Children_Type)

Create Type Address_Type as Object
    (STREET   VARCHAR(30),
     ZIP      VARCHAR(10))

Create Type Children_Type as VARRAY of Varchar(30)

Create Table Person_Objects as Person_Type
```
DDL 301

```
Select * from Person_Objects
```
Query Q0

TECHNIQUE OF USING XMLTYPE TREE AS THE TYPE INFRASTRUCTURE FOR XML

This application claims priority to U.S. Provisional No. 60/599,319, entitled Efficient Evaluation of Queries Using Translation by Zhen Hua Liu et al. on Aug. 6, 2004, the contents of which are herein incorporated hereafter by reference as if originally set forth herein.

This application is related to U.S. patent application Ser. No. 10/428,878, entitled Techniques For Rewriting XML Queries Directed To Relational Database Constructs, filed by Anand Manikutty, et al. on May 1, 2003, referred to hereafter as the "Rewrite Application", the contents of which are herein incorporated herein by reference as if originally set forth herein.

This application is related to U.S. patent application Ser. No. 09/149,889, entitled Opaque Types, filed by Rajagopalan Govindarajan, et al. on Sep. 8, 1998, now issued as U.S. Pat. No. 6,286,015, referred to hereafter as the "Opaque Types application", the contents of which are herein incorporated by reference as if originally set forth herein.

This application is related to U.S. patent application Ser. No. 10/259,278, entitled Mechanism for Mapping XML Schemas to Object-Relational Database Systems, filed by Ravi Murthy, et al. on Sep. 27, 2002, the contents of which are incorporated herein by reference.

This application is related to U.S. Provisional Patent Application Ser. No. 60/230,878, entitled XML Data Storage, Query Rewrites, Visualization, Mapping And Referencing, filed on Sep. 7, 2000 by Muralidhar Krishnaprasad, et al., the contents of which are incorporated herein by reference.

This application is related to U.S. patent application Ser. No. 09/948,998, entitled Method And Apparatus For Flexible Storage And Uniform Manipulation Of Xml Data In a Relational Database System, filed on Sep. 9, 2001 by Muralidhar Krishnaprasad, et al., the contents of which are incorporated herein by reference.

FIELD OF THE INVENTION

The present invention relates to accessing structured information stored in databases and more specifically to techniques for representing data types of XML data or other hierarchically related data.

BACKGROUND OF THE INVENTION

The Extensible Markup Language (XML) is a standard for data and documents that is finding wide acceptance in the computer industry. XML describes and provides structure to a body of data, such as a file or data packet. The XML standard provides for tags that delimit the sections of an XML entity referred to as XML elements. Each XML element may contain one or more name-value pairs referred to as attributes. The following XML Segment A is provided to illustrate XML.

---
SEGMENT A

```
<book>
    <publication publisher="Doubleday"
        date="January"></publication>
    <Author>Mark Berry</Author>
</book>
```
---

XML elements are delimited by a start tag and a corresponding end tag. For example, segment A contains the start tag <Author> and the end tag </Author> to delimit an element. The data between the elements is referred to as the element's content. In the case of this element, the content of the element is the text value Mark Berry.

An element is herein referred to by its start tag. For example, the element delimited by the start and end tags <publication> and </publication> is referred to as element <publication>.

Element content may contain various other types of data, which include attributes and other elements. The book element is an example of an element that contains one or more elements. Specifically, book contains two elements: publication and author. An element that is contained by another element is referred to as a descendant of that element. Thus, elements <publication> and <author> are descendants of element <book>. An element's attributes are also referred to as being contained by the element.

By defining an element that contains attributes and descendant elements, the XML entity defines a hierarchical tree relationship between the element, its descendant elements, and its attributes. A set of elements that have such a hierarchical tree relationship is referred to herein as an XML document.

An important feature of XML is that it may be used to define XML documents that conform to industry standards. One such standard is the Document Object Model (DOM), promulgated by the W3C.

The SQL/XML standard defines an XML data type (INCITS/ISO/IEC 9075-14:2003, which is incorporated herein by reference) in an SQL system. An object-relational database system may support XMLType as a native built-in data type representing XML values just as any other native data type, such as VARCHAR, the name of an SQL data type representing variable length character values. XML value refers to any value represented by the XQuery Data Model. The XQuery Data Model is described in XQuery 1.0 and Xpath2.0 Data Model, W3C Working Draft, 29 Oct. 2004, which is incorporated herein by reference. An XML value is referred to herein as an XMLType instance. Object-relational database systems use XMLType to represent XMLType instances used or generated in very diversified situations. For example, XMLType instances can be XML documents natively stored in XMLType tables or XMLType columns of tables. The XMLType instances can be generated from relational tables and views using SQL/XML publishing functions, such as XMLElement( ) and XMLAgg( ). The XMLType instances can be generated from the result of an XQuery embedded in an XMLQuery( ) function or XMLTable construct. The XMLType instance can be generated from the result of an XPath embedded in extract( ) function. An XMLType instance can be the return type of a user defined or system defined function. An XMLType instance can be converted from an object type, collection type or an arbitrary user defined opaque type in an object-relational database system. Throughout this document, 'XMLType' is used as the datatype name used for representing XML values. Throughout this document, the term 'SQL expression' refers to an expression that can be used in an SQL query or SQL procedural languages that are used to write user defined functions and procedures. Examples of SQL expressions are table or view columns, arithmetic functions, logical functions, SQL case functions, SQL/XML publishing functions, XMLQuery( ) functions, extract( ) functions, PL/SQL variables, etc.

Information about the structure of specific types of XML documents may be specified in documents referred to as "XML schemas". For example, the XML schema for a particular type of XML document may specify the names for the data items contained in that particular type of XML document, the hierarchical relationship between the data items contained in that type of XML document, and the type values contained in that particular type of XML document, etc. A standard for an XML schema is XML Schema, Part 0, Part 1, Part 2, W3C Recommendation, 2 May 2001, the contents of which are incorporated herein by reference.

XML Storage Mechanisms

Various types of storage mechanisms are used to store an XML document. One type of storage mechanism stores an XML document as a text file in a file system.

Another type of storage mechanism uses object-relational database systems that have been enhanced to store and process queries for XMLType instances. For example, an XML schema may be registered with an object-relational database system. During the registration process for a given XML schema, the database system determines (1) a database representation for the XML schema and (2) mapping information mapping the XML schema to components of the database representation. Determining the database representation for a given XML schema may involve, for example, determining the columns, database objects, collection types, constraints, and even the indexes that are to be used by the database system to store data for XML documents that conform to the given XML schema.

For example, a database representation of an entire XML document may be a CLOB (binary large object), or one or more tables whose columns store the components of an XML document in one or more rows. A database representation may be a hierarchy of objects in an object-relational database; each object is an instance of an object class and stores one or more elements of an XML document. The object class defines, for example, the structure corresponding to an element, and includes references or pointers to objects representing the immediate descendants of the element.

Data Typing Needed to Rewrite XML Query Languages into SQL Query

It is important for object-relational database systems that store XMLType instances to be able to efficiently execute queries using XML query languages, such as XQuery/XPath. XML Query Language ("XQuery") and XML Path Language ("XPath") are important standard query languages for XML, and can be used in conjunction with SQL to express a large variety of useful queries. XPath is described in *XML Path Language (XPATH)*, version 1.0, W3C Recommendation 16 Nov. 1999, which is incorporated herein by reference. XPath 2.0 and XQuery 1.0 are described in XQuery 1.0 and XPath 2.0 Full-Text, W3C Working Draft 9 Oct. 2004, which is incorporated herein by reference.

Various approaches have been developed for an object-relational database system to execute XQuery/XPath queries. One approach for executing XQuery/XPath queries is referred to herein as the "rewrite" approach, or as query rewriting. XQuery/XPath queries received by an object-relational database system are dynamically rewritten to directly reference and access the underlying object-relational data. Specific techniques for implementing the rewrite approach are described in the above XQuery and XPath Translation and Rewrite patent Applications.

The process of rewriting XPATH and XQuery may depend on a procedure referred to herein as data typing. Data typing refers to the process of determining the type structure of XMLType instance from variety of XML data sources during query compilation time. There can be multiple type representations for the type structure of XMLType. The type structure generated by data typing process is used to type check an XQuery and XPath during compile time and determine how to correctly and optimally rewrite the XQuery and XPath.

For example, the following XQuery may be rewritten to the following SQL query.

XQ: for $I in/PurchaseOrder/LineItems where $i//@lineno>45 return $i

SQL: SELECT value(v)
  FROM table(xmlsequence(extract(poview,'/PurchaseOrder/LineItems'))) v
  WHERE extractValue(value(v), 'LineItems/@lineno')>45

Rewriting XQuery might include checking that the data type of lineno is numeric so that the comparison operation in XQ (i.e. $i/@lineno>45) can be rewritten into equivalent SQL numeric comparison operators. Determining how to rewrite query XQ might depend on determining whether lineno is a scalar or collection data type. If lineno is a collection type, then the WHERE clause in SQL requires an EXISTS subquery operation.

The reference poview in SQL is a name of a view defined by an object-relational database system. A view is an object-relational database construct for a stored query that generates a set of rows with columns from one or more tables, when a query directed to the view is executed. An XML type view is a stored query that generates a data stream of XML values from, for example, columns in one or more tables, when a query directed to the XML type view is executed. XML type views are described in greater detail in the Rewrite application.

Object-relational data structures, such as a table, columns and object types, and abstractions of database data, such as a view and its columns, have data types defined by a database management system's object-relational metadata, and are thus "known" to the object-relational database system. Object-relational metadata is metadata that describes database objects and data structures managed by the database management system and that can be referenced by database statements processed by the database system as data structures recognized by the database management system. Database objects and data structures include tables, object tables, columns, object types, and views. In many scenarios in which XMLType instances are processed by an object-relational database system, particularly those scenarios involving the rewrite of XQuery/XPath queries, the XMLType instances are not explicitly defined by the metadata of object-relational database systems. When the type structure of XMLType instances being processed by an object-relational database system are not known to the database system during query compile time, many optimizations for querying and modifying XMLType instances can not be achieved that could otherwise be achieved if the type structure of the XMLType instances were known during query compile time.

One possible approach to resolve this problem is to use one or more ad-hoc mechanisms for generating a type representation for the type structure of XMLType. For example, in the case of an XMLType instance conforming to an XML schema, the type representation of the XMLType instance can be represented by an XML schema so that rewrite of an XPath/XQuery query is feasible. For XMLType instances generated from SQL/XML functions, the type representation of the XMLType instances can be an SQL expression tree so that query rewrite is feasible. For XMLType instances generated from XQuery embedded in the XMLQuery( ) function, the type representation of an XMLType instance can be the result type of the underlying XQuery expression which generates the result. For an XMLType instance generated from object-relational data via SYS_XMLGEN( ) function (a function that returns an XMLType instance based on an object type defined by an objection-relational database system), the type representation of the XMLType instance can be the object type metadata maintained by the object-relational database system.

However, for such ad-hoc approaches, the use of diverse kinds of type representation, i.e. XML schema, SQL expression operator tree, XQuery expression tree and object type metadata, greatly complicates data typing, modification, and optimization of XQuery/XPath queries, because the data typing procedures have to handle multiple hybrid forms of type representations to describe XMLType instances.

Therefore, there is a need for a mechanism to represent the type structure of an XMLType instance from diverse XML data sources in a uniform way.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for generating a type representation for XMLType instances is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is a universal format for a type representation of type structure of XMLType instances that are generated in various ways from various data sources, SQL expressions and queries, and storage mechanisms. This format or type representation is referred to herein as an XMLType type tree. The structure of an XMLType type tree is represented as a hierarchy of nodes forming a tree. An XMLType type tree serves as a digest of the type structure of an XMLType instance. An XMLType type tree can describe the type structure of an XMLtype instance, no matter the source of the XMLType instance or its manner of generation. An XMLType type tree provides an abstraction such that the XQuery and XPath rewrite layer involved in data typing XML type instances only have to deal with one abstraction (i.e. type representation) instead of numerous ad-hoc abstractions. An XMLType manager encapsulates and hides the details of the XMLType type tree construction, manipulating and performing type computation on the XMLType type tree, allowing other processing layers to interact with the XMLType manager rather than the XMLType type tree.

An XMLType type tree may be generated based on heterogeneous sources of data type information. A source of data type information is data that conforms to a format, syntax, and/or standard, that may be used to derive data type information based on the format, syntax, and/or standard. A source of data type information may be an XML schema. Another source of data type information may be the object type metadata that conforms to a proprietary format. Yet another source of data type information may also be an SQL expression which generates XMLType instances; such expressions can be found in a query or subquery of the definition of an XMLType view. Yet another source of data type information may also be an SQL table or view XMLType columns. The term "heterogeneous" refers to the fact that the sources of data type information may each conform to a different format, syntax, and standard, such as XML Schema, SQL expression tree, XQuery, XPath query result, or object metadata having a proprietary format used by an object-relational database system to define object types.

XMLType Type Tree Structure

An XMLType type tree consists of a hierarchy of nodes that is used to represent the structure of an XMLType instance because a tree structure supports recursion and is able to support type structure of XML instances with arbitrarily complex structures. The XMLType type tree is a logical tree whose physical representation can be an in memory tree or a serialized version of the tree stored on disk or in memory.

According to an embodiment, an XMLType type tree may contain four kinds of nodes: a leaf item node, a composite item node, an operator node, and an aggregate node. A leaf item node of an XMLType type tree does not have any descendants. A leaf item node of an XMLType type tree may represent the type of an XMLType instance of an XQuery empty sequence, or an XMLType instance of an XQuery atomic value in the XQuery data model. A "leaf item attribute node" of an XMLType type tree represents the type of an XMLType instance of a standalone attribute node. A "leaf item text node" of an XMLType type tree represents the type of an XMLType instance of a standalone text node.

A "leaf item processing instruction node" of an XMLType type tree represents the type of an XMLType instance of a standalone processing instruction node. A "leaf item comment node" of an XMLType type tree represents the type of an XMLType instance of a standalone comment node.

A "composite item node" of an XMLType type tree represents the type of an XMLType instance of an element node (which may have children nodes) or represents the type of an XMLType instance of a document node (which may have children nodes).

An operator node of an XMLType type tree represents how its children nodes are grouped (for example, via sequence or via choice or via permutation). There are various kinds of operator nodes. A "sequence operator node" represents the composition of an ordered set of its children nodes. A "choice operator node" represents the composition of a choice of its children nodes as exclusive alternates in a set. A "permutation operator node" represents a permutation of its children nodes—the nodes may appear in any order or not at all.

In an embodiment, the operator node may correspond to an XML Schema compositor, which specifies the content model of a complex type. In another embodiment, the choice operator node may correspond to an SQL CASE expression with each of its branches representing the choice of its children branch. In another embodiment, the sequence operator node may correspond to object type with each of its member attributes representing the sequence of its children nodes.

An aggregate node is associated with an aggregate quantifier, which identifies restrictions on cardinality of its children nodes. The aggregate quantifier can be set to the following values:

1) "?", zero or one,
2) "*", zero or more,
3) "+", one or more.

In an embodiment, an aggregate node with quantifier set to zero or more is constructed for a collection type converted to XMLType.

An XMLType type tree can be built recursively using a leaf item node, composite item node, operator node and aggregate node. The XMLType type tree represents the type structure of an XMLType instance.

Construction of XMLType Type Tree for an SQL Expression Returning XMLType

An XMLType type tree is used to describe an XMLType instance returned from an SQL expression. Given an SQL expression, the XMLType type tree for it can be built in bottom-up manner by recursively building the XMLType type tree from the sub-expressions of the original SQL expression. For example, for an SQL expression casting a scalar SQL type to XMLType, the corresponding XMLType type tree consists of a leaf item node corresponding to an XML atomic value whose type is derived from the scalar SQL type, e.g., for an SQL expression casting a SQL NUMBER type to XMLType, the corresponding XMLType type tree is a leaf item node of xs:decimal atomic type.

For an SQL expression using the function SYS_XML-GEN() to convert an object type to XMLType, its corresponding XMLType type tree is based on database system metadata defining the object type. The root node of the XMLType type tree is a composite element item node corresponding to the top object type. Descending from the composite item node is a sequence operator node. Descending from the sequence operator node is a set of element nodes, each of which corresponds to a member attribute of the object type.

For an SQL expression using the function SYS_XML-GEN() to convert a collection type to XMLType, its corresponding XMLType type tree is an aggregate node with aggregate quantifier set to zero or more. The child node of the aggregate node is constructed from the collection element type.

For an SQL/XML query using an SQL/XML publishing function, an XMLElement() function return type is represented by an XMLType type tree of an element or document node depending on whether the XMLElement() returns the sequence or content option. The return type of an XMLAgg() function returning sequence option is represented by an XMLType type tree with an aggregate node with aggregate quantifier set to zero or more.

XMLType type tree of an SQL CASE expression is a choice operator node with descendant nodes representing choices of each CASE branch.

The XMLType type tree of an SQL MakeXML() expression, which represents an XMLType column with different storage options, is an XMLType type tree representing the XML schema associated with the column. If no XML schema is associated with the column, then an XMLType type tree of an aggregate node with aggregate quantifier set to zero or more is constructed. The child of the aggregate node is a choice operator node with the following children nodes: a leaf item atomic node, an attribute leaf item node, a text leaf item node, a comment leaf item node, a processing instruction item node, an element composite item node, a document composite item node.

For the Extract() and XMLQuery() operator, its XMLType type tree is the result of the data typing of the XPath or the XQuery query embedded in the Extract() and XMLQuery() operator respectively.

Illustration of XMLType Type Tree

Figure 1:
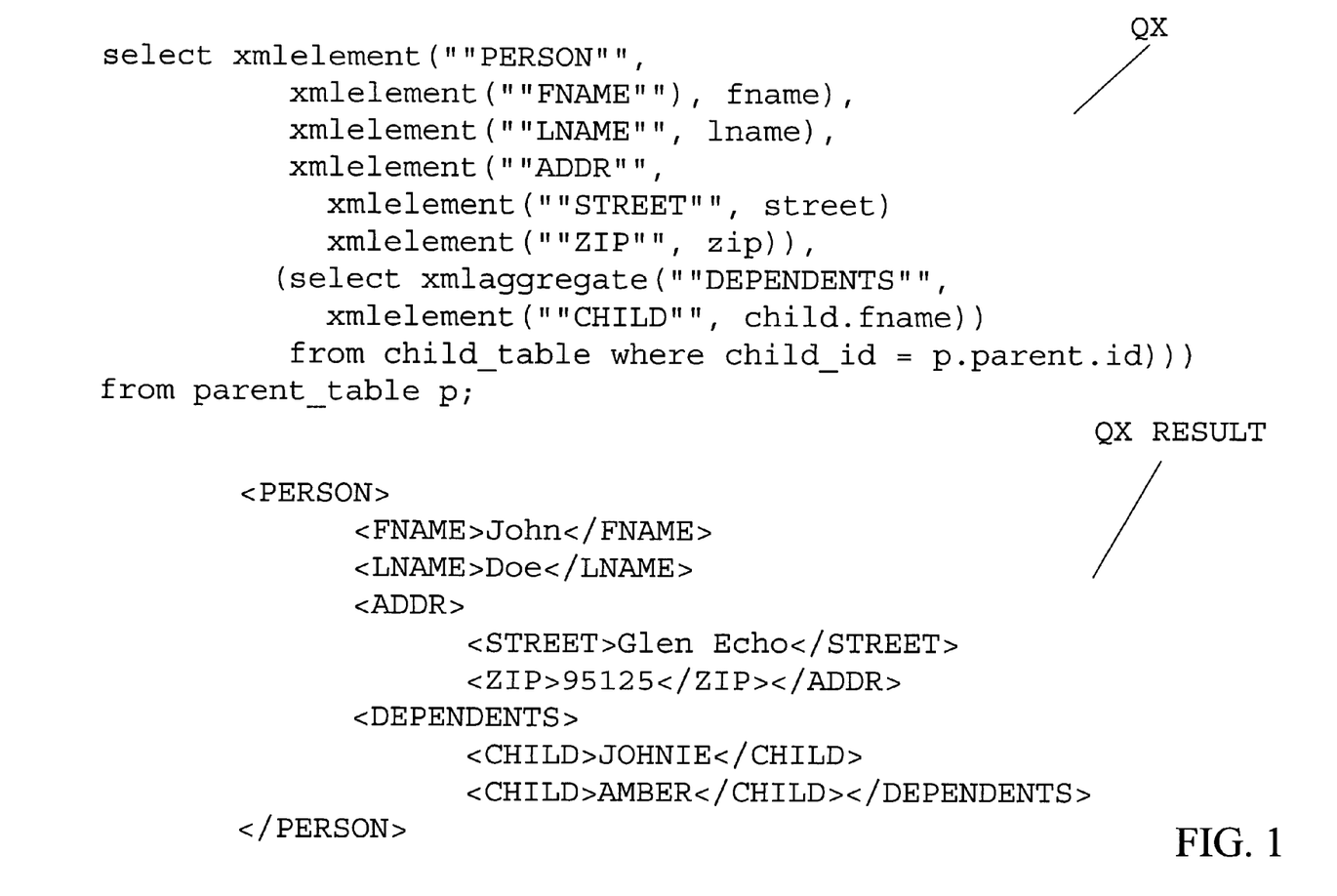
FIG. 1 is a diagram that illustrates an SQL/XML query and sample results returned for the query that are used to illustrate an embodiment.
Figure 2:
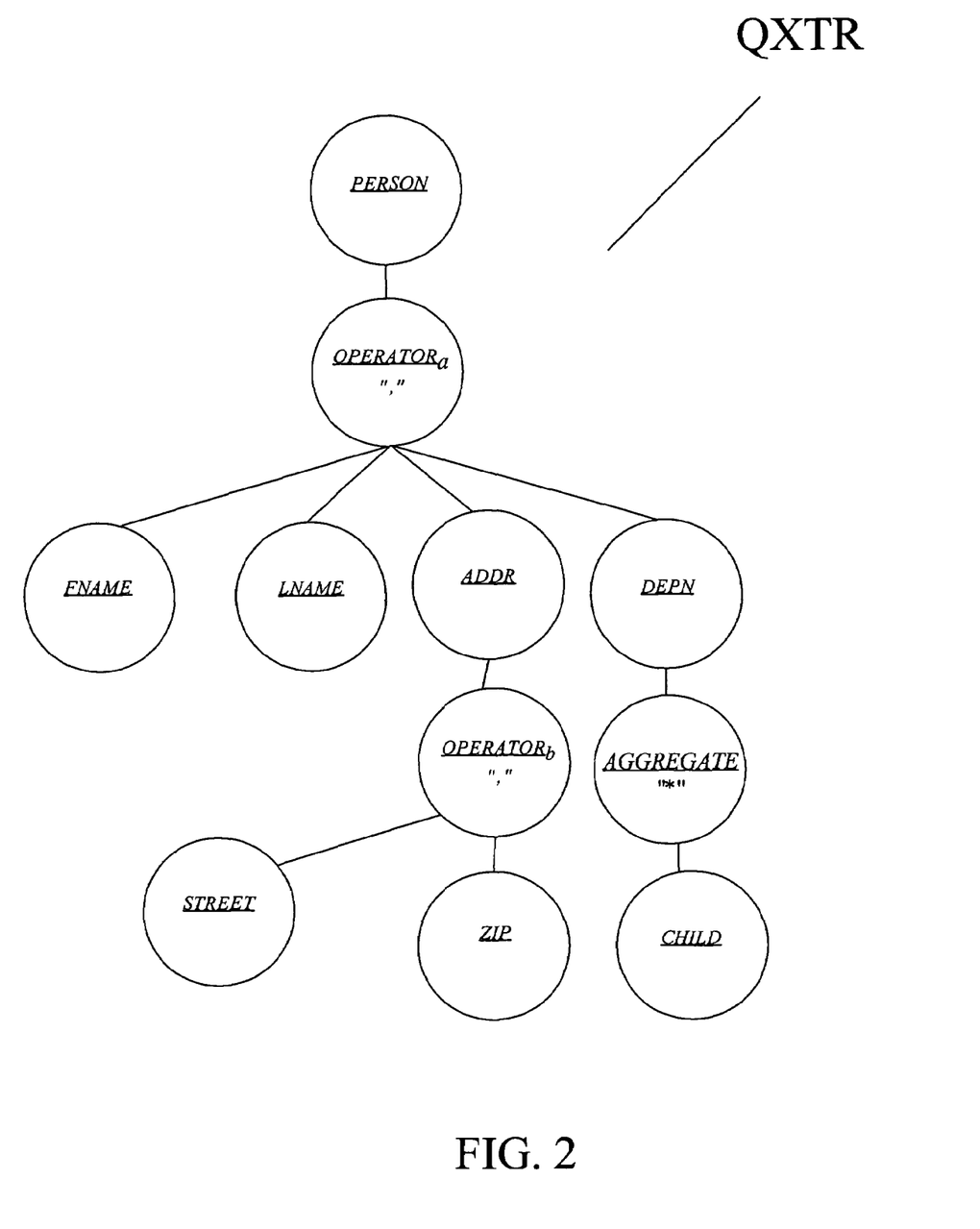
FIG. 2 is a diagram of an XMLType type tree of nodes used to represent an XMLType instance according to an embodiment.

FIG. 1 depicts an SQL expression and FIG. 2 depicts an XMLType type tree. Both of these are used to illustrate an embodiment of the present invention.

Referring to FIG. 1, it shows query QX. Query QX returns data from table parent_table as XML instances of the XMLType. The SELECT clause of query QX references "XML publishing functions", i.e. XMLElement() and XMLAgg(). XML publishing functions are functions that are defined by a database language, such as SQL/XML, to return an XMLType instance. SQL/XML standard for SQL defines XML publishing functions, such as those referenced by query QX, that return XML type instances. An XMLType instance representing an example of results returned by query QX is shown in FIG. 1 as QX RESULT.

FIG. 2 shows XMLType Type tree QXTR, a type representation of the XMLType instance returned for query QX. QXTR includes composite item node element PERSON, which represents XMLType instance of element <PERSON> returned by query QX (see FIG. 1). A composite item node is used to represent XMLType instance of element <PERSON> because <PERSON> is an element with a descendant. Node OPERATOR$_a$ is an operator node, representing that the immediate descendants of <PERSON> forming a sequence. The sequence includes XMLType type tree nodes FNAME, LNAME, ADDR, and DEPN, which correspond to the XMLType instance of elements <FNAME>, <LNAME>, <ADDR>, and <DEPN>, respectively.

Node FNAME is a composite item node and corresponds to <FNAME>. Its child is a leaf item text node. Node LNAME is a composite item node and corresponds to <LNAME>.

Node ADDR is a composite item node (i.e. element node), and node OPERATOR$_b$ is an operator node defining the composition of immediate descendants of node ADDR, which is a sequence of composite item nodes STREET and ZIP, each of which has a leaf item text node (not shown).

Node DEPN is a composite item node (i.e. element node), and node AGGREGATE is an aggregate node with aggregate quantifier set to zero or more having a composite item element node CHILD.

Figure 3:
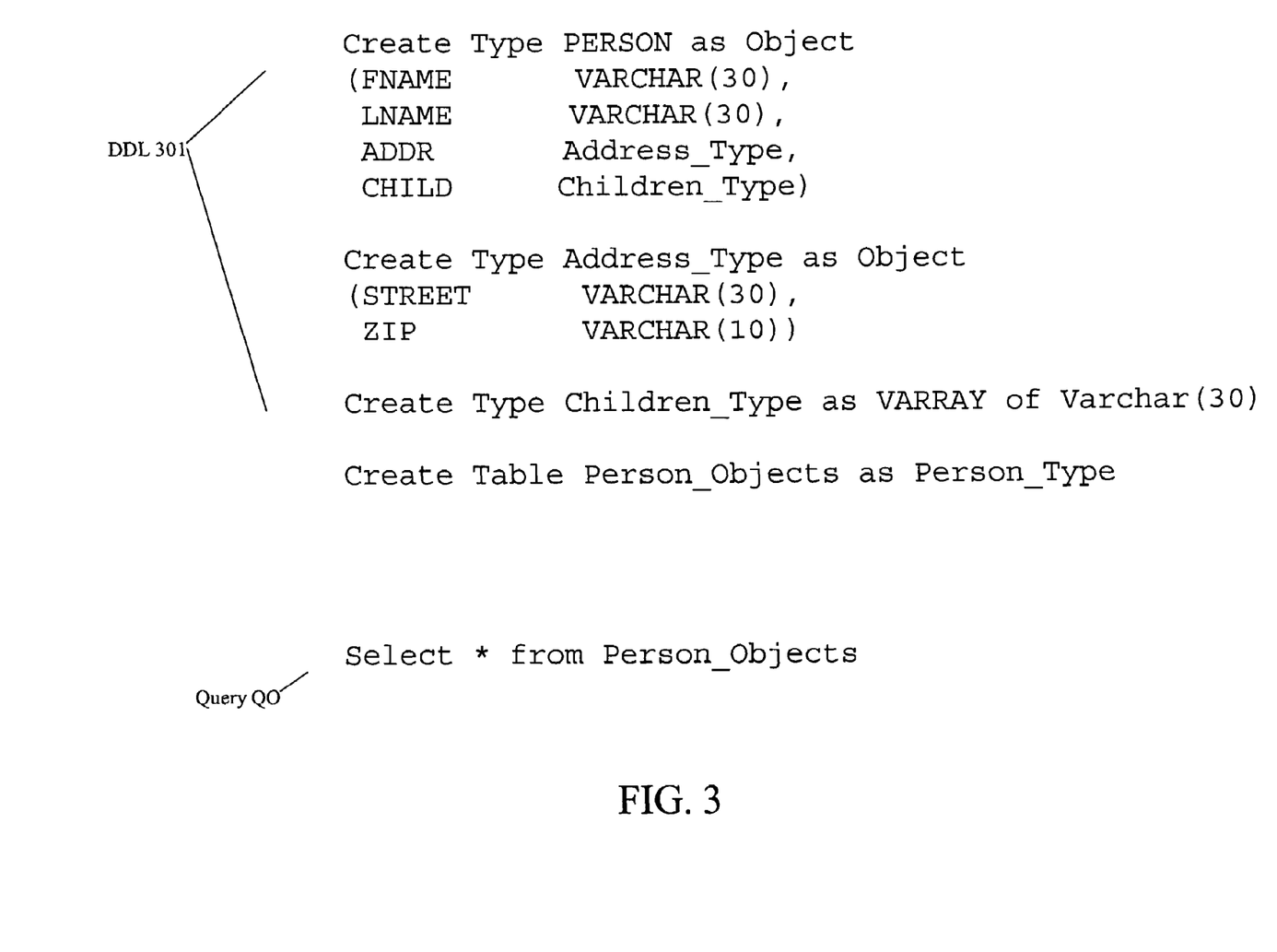
FIG. 3 is a diagram of a DDL statement for object types and a table, and a query that returns objects of said object types, which are used to illustrate an embodiment.

FIG. 3 shows query QO, which returns an object belonging to an object type, and is used to demonstrate that an XMLType type tree can represent other types of hierarchical data structures that can be converted into an XML type instance equivalent of other types of hierarchical data structures. Referring to FIG. 3, query QO returns objects of the object type PERSON. DDL 301 includes data definition language ("DDL") statements that may be used to define object PERSON, and an object table Person_Objects within an object-relational database system.

Node PERSON corresponds to the PERSON object type, and sequence of nodes FNAME, LNAME, ADDR, and DEPN correspond to member attributes FNAME, LNAME, ADDR, and CHILD. Node ADDR is a composite node because member attribute ADDR is an object type; the member attributes of ADDR, which are STREET and ZIP, are represented by the sequence comprised of nodes STREET and ZIP. Node DEPN is a composite node because attribute member DEPN is a collection, i.e. a VARRAY of the variable character strings.

The following Table A lists a set of rules of how XMLType type trees are constructed from SQL expressions returning an XMLType instance.

the XML schema info (such as a schema identifier and element identifier) is stashed in the XMLType type tree so that further expansion of the node into a sub tree can be performed when needed. This allows XMLType type tree expansion as the XPath expression analysis drills down on the schema based XMLType instance.

TABLE A

| SQL/XML Expression | XMLType Type Tree |
| --- | --- |
| SQL Expr casting SQL Scalar Type to XMLType | Atomic leaf item node |
| SQL/XML function converting SQL object type to XMLType, such as SYS_XMLGEN( ) | Element composite node with a sequence child node having each child constructed from each attribute member of object type |
| SQL/XML function converting collection type to XMLType, such as SYS_XMLGEN( ) | Aggregate node with aggregate quantifier set to zero or more and descendant node constructed from the collection element type |
| XMLElement( ) SQL/XML function returning sequence option | Element node with descendants |
| XMLElement( ) SQL/XML function returning content option | Document node with the element node and its descendants |
| XMLAttribute( ) SQL/XML function | Attribute node |
| XMLCONCAT SQL/XML function returning sequence option | Sequence operator node with descendants |
| XMLCONCAT SQL/XML function returning content option | Document node with all the descendants |
| XMLAgg( ) SQL/XML function returning sequence option | Aggregate node with quantifier set to zero or more and descendants |
| XMLAgg( ) SQL/XML function returning content option | Document node with aggregate node with quantifier set to zero or more and descendants |
| SQL CASE function | Choice operator node with each branch of CASE function becoming a descendant of the choice operator node |
| Any XMLQuery functions embedding XPath, such as extract( ) function | XMLType type tree constructed via the data typing analysis of the XPath during compile time. |
| Any SQL/XML function with embedding XQuery, such as XMLQuery( ) function | XMLType type tree constructed via the data typing analysis of the XQuery during compile time |
| Schema based XMLType instance expression, such as MKXML( ) function | XMLType type tree with schema info stored |
| A generic SQL/XML function returning an XMLType whose structure is unknown during query compile time | XMLType type tree of an aggregate node with aggregate quantifier set to zero or more is constructed. The child of the aggregate node is a choice operator node with the following children nodes: a leaf item atomic node, an attribute leaf item node, a text leaf item node, a comment leaf item node, a processing instruction leaf item node, an element composite item node, a document composite item node. |

Construction of XMLType Type Tree from an XMLType with an XML Schema:

Constructs of an XML Schema can be represented as an XMLType type tree. The sequence, choice, and all content models can be represented as sequence, choice, and permutation operator nodes respectively. The occurrence specification of an element can be constructed as an aggregate node. The substitution group elements can be constructed as a choice operator node.

Furthermore, since XML schema is large and can be loaded lazily for efficiency, the XMLType type tree construction can be done lazily too. For each XMLType type tree node that corresponds to an element in the XML schema, the element's children are not constructed until needed for access. To accomplish the lazy construction of an XMLType type tree, Construction of XMLType Type Tree from Object Type or Collection Type Converted to XMLType Object type in an object-relational database can be transformed into an XMLType instance via the SYS_XMLGEN( ) function. An XMLType type tree can be constructed from object-relational metadata. Given an object type as input, each member of the object type can be represented as an attribute or element node of an XMLType type tree. Given a collection type as input, an XMLType type tree with an aggregate node having aggregate quantifier set as zero or more is constructed. The child node of the aggregate node constructed from the collection element type.

Construction of XMLType Type Tree for User Defined Function Returning XMLType

Object-relational database systems, such as Oracle, have the ability to support a user-defined function infrastructure that enables a user to plug in a user defined function written in different programming languages, such as PL/SQL, Java or C. An important feature for this ability is to describe the type structure of XMLType for a user-defined function's return value and parameters. An XMLType Type Tree may be used for type representations of the parameters and return value of such user-defined functions.

Construction of XMLType Type Tree for XMLType Converted from an User Defined Opaque Type Currently, an object-relational database system, such as Oracle, supports a user-defined infrastructure that allows a user to "plug" in an "opaque" data type as a native data type. Such object-relational database systems define and support a set of callback interface functions, which the user implements and registers. (See Opaque Types application) The set of callback interface functions may include a toXML( ) function that returns an XMLType converted from the user defined opaque data type. Such an XMLType instance may be queried using XQuery/XPath. Since an opaque data type structure may not be known to an object-relational database system, the structural type of the XMLType instance returned by the toXML( ) method may not be known to the object-relational database system. Consequently, data typing of the output XMLType instance and query rewriting may not be feasible. However, a new callback interface function, getXMLType-Tree( ), may be implemented to expose the type structure of an XMLType instance and return an XMLType type tree as the type representation of the XMLType instance. The implementation of getXMLTypeTree( ) thus constructs an XMLType type tree that can be used for XQuery and XPath query rewrite.

Construction of XMLType Type Tree for XQuery/XPath to SQL/XML Query Rewrite

Once an XMLType type tree is constructed for an arbitrary SQL expression, the XMLType type tree guides the query rewrite procedure. With the XMLType type tree at hand during query rewrite, data type information can be systematically and quickly determined without need to decipher various ad hoc type representations, such as an XML Schema, an SQL expression tree, or an object-relational metadata for an object type. For example, a key piece of information needed during XML query rewrite is whether an element is a collection or a scalar element. Once this key information is known, a general comparison operation can be transformed into an optimized scalar comparison. Furthermore, once the XMLType Type Tree is constructed for the input XMLType, data typing on XQuery and XPath during query compile time can be done based on the input XMLType Type Tree. The XMLType type computed from the the data typing analysis of XPath or XQuery represents the type structure of XMLType returned by XMLQuery function which embeds such XPath or XQuery.

XMLType Type Tree Algebra Rule

Algebraic rules can be used to normalize and optimize an XMLType type tree. The rules specify that a particular composition of nodes is equivalent to another particular composition of nodes. Application of such nodes may reduce the number nodes and/or complexity of an XMLType Type Tree. The following are examples of algebraic rules for XMLType Type Trees. The following notation is used:

T—a tree of one or more nodes.

"empty"—an empty set of nodes

"|"—an exclusive choice between the operands on either side.

"&"—represents that both operands on either side are required in a set of nodes.

";"—a separator that separates members of a sequence.

Empty Sequence Type Algebra Rules

TABLE ES

| 1 | empty * = empty |
| 2 | empty ? = empty |
| 3 | empty+ = empty |
| 4 | (T1, . . . , empty, . . . Tn) = (T1, . . . , Tn) |

Choice Distribution Algebra Rule

TABLE CD

| 1 | (T1|T2) * = T1*|T2* |
| 2 | (T1|T2) ? = T1?|T2? |
| 3 | (T1|T2)+ = T1 + | T2+ |

Type Composition Algebra Rule

TABLE TC

| 1 | (T*) * = T* |
| 2 | (T*) ? = T* |
| 3 | (T*)+ = T* |
| 4 | (T?) ? = T? |
| 5 | (T?)* = T* |
| 6 | (T?)+ = T* |
| 7 | (T+)? = T* |
| 8 | (T+)+ = T+ |
| 9 | (T+)* = T* |

Content Model Algebra Rules

TABLE CM

| 1 | T1 & T2 = (T1, T2) | (T2, T1) |
| 2 | T|T = T |
| 3 | T & T = T, T |

Type Normalization Algebra Rule

TABLE TN

| 1 | T? = empty | T |
| 2 | T * = empty |T+ |

Illustration of Algebraic Rules

Figure 4:
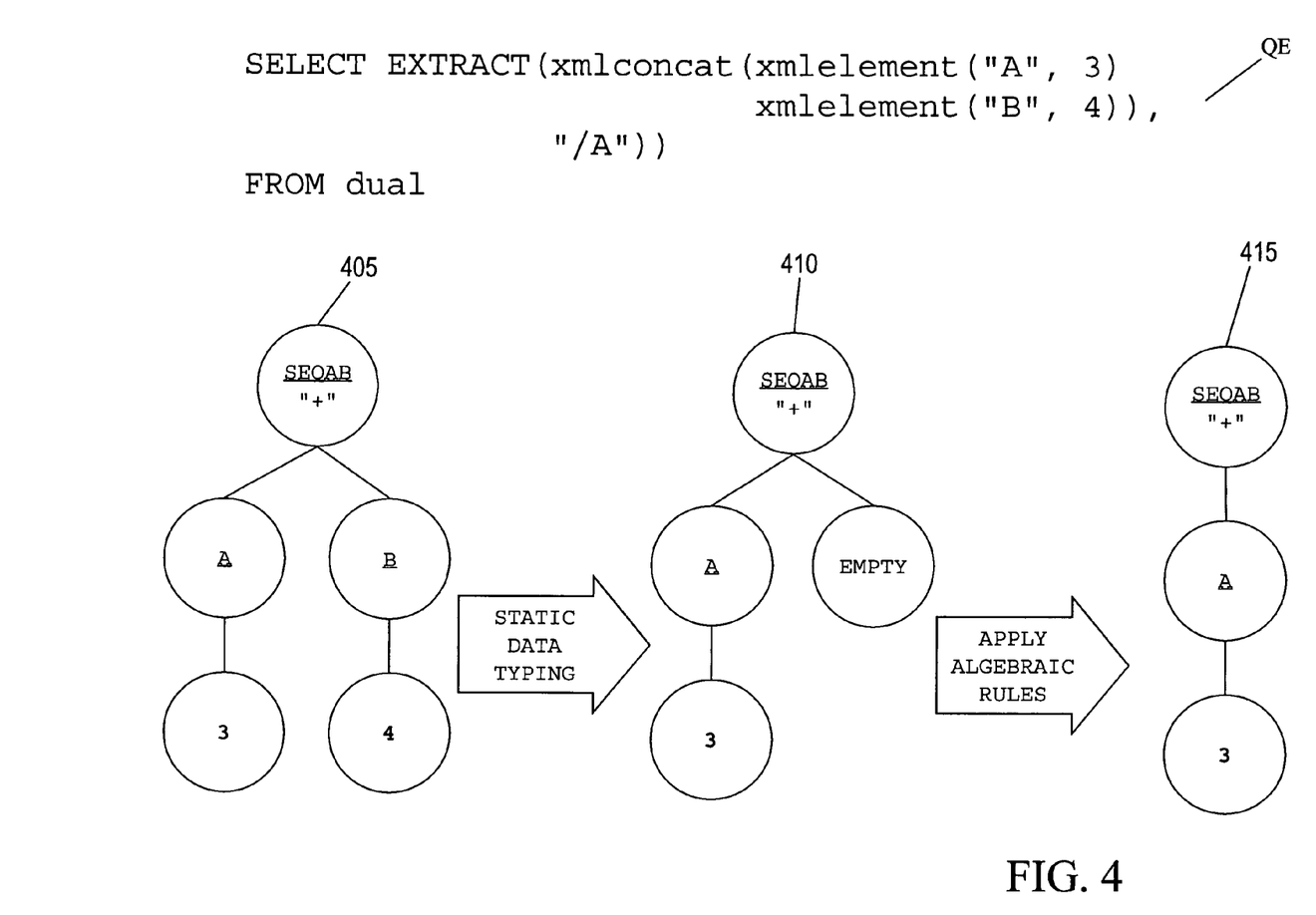
FIG. 4 is a diagram of an XMLType node tree used to illustrate the application of algebraic rules to transform the node tree to an equivalent structure according to an embodiment of the present invention.

FIG. 4 shows SQL query QE and XMLType Type Trees 405, 410, and 415, which are used to illustrate application of algebraic rules according to an embodiment of the present invention. Referring to FIG. 4, XML tree 405 is the XMLType type tree for the set of XMLElement functions that serve as input to the EXTRACT function of query QE. Node SEQAB is a sequence operator node, and has descendant element composite item nodes A and B.

XMLType Type Tree 410 is the XMLType type tree for the output of the EXTRACT function of query QE. XMLType Type Tree 410 differs from XMLType Type Tree 405 in that an empty node replaces node B. Node B did not fall under the XPATH path "/A" specified in the EXTRACT function.

Rule 4 in Table ES, i.e. (T1, . . . , empty, . . . Tn)= (T1, . . . , Tn), specifies that a sequence of nodes with an empty node may be replaced with the same sequence of nodes with the empty node removed. XMLType Type Tree 415 shows the result of applying Rule 4 in Table ES. The descendant empty node has been removed.

Figure 5:
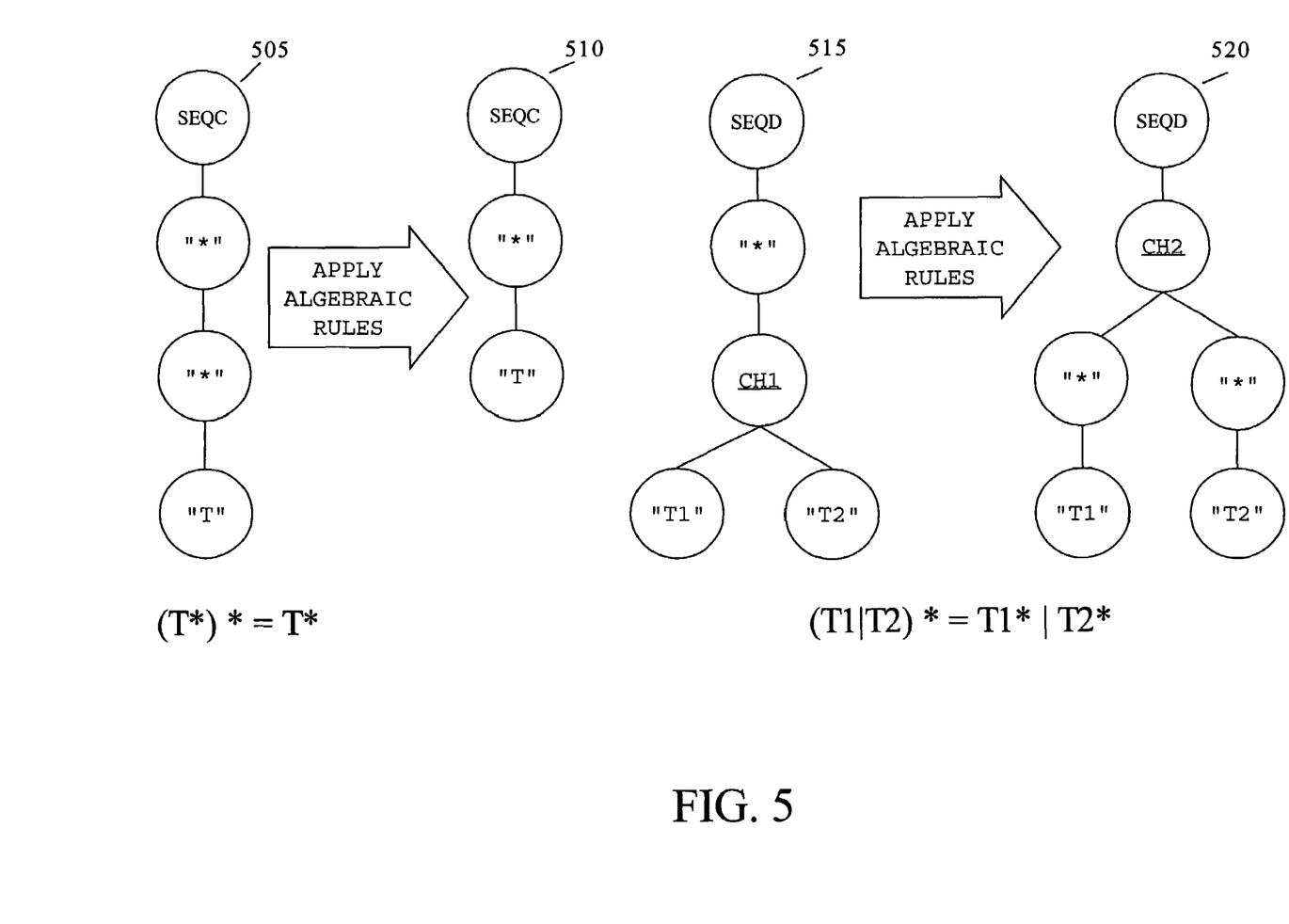
FIG. 5 is a diagram of an XMLType node tree used to illustrate the application of algebraic rules to transform the node tree to an equivalent structure according to an embodiment of the present invention.

FIG. 5 shows further examples. XMLType type tree 505 and 510 are used to illustrate application of Rule 1 in Table TC, (T*)*=T*. XMLType type tree 505 and XMLType type tree 510 represents the left and right side of Rule 1, respectively. XMLType type tree 505 includes sequence operator node SEQC, from which descends an operator node associated with aggregate quantifier "*", from which descends another operator node associated with aggregate quantifier "*", from which descends a node for T. Application of Rule 1 may be used to transform the XMLType type tree 505 to its equivalent XMLType type tree 510, having one of the operator nodes in XMLType type tree 505 removed.

XMLType type trees 515 and 520 are used to illustrate the application of Rule 1 in Table CD, (T1|T2)*=T1*|T2*. XML-Type Type Tree 515 and XMLType type tree 520 represent the left and right side of Rule 1, respectively. XMLType type tree 515 includes sequence operator node SEQD, from which descends an operator node associated with aggregate quantifier "*", from which descends a choice operator node, from which descends a leaf node for T1 and a leaf node for T2. Application of Rule 1 may be used to transform XMLType type tree 515 to its equivalent XMLType type tree 520, which includes sequence operator node SEQD, from which descends a choice operator node, from which descends two operator nodes associated with aggregate quantifier "*". From one of the operator nodes descends a leaf node for T1; from the other operator descends a leaf node for T2.

The embodiments of the present invention have been illustrated by using XMLType type trees as the type infrastructure to represent type structure of any XMLType instances from variety of XML data sources. However, the present invention is not so limited. The techniques for representing type infrastructure for XMLType may be used for any data type, and particularly, for representing data types involving hierarchically related data structures, via an universal type tree structure.

Hardware Overview

Figure 6:
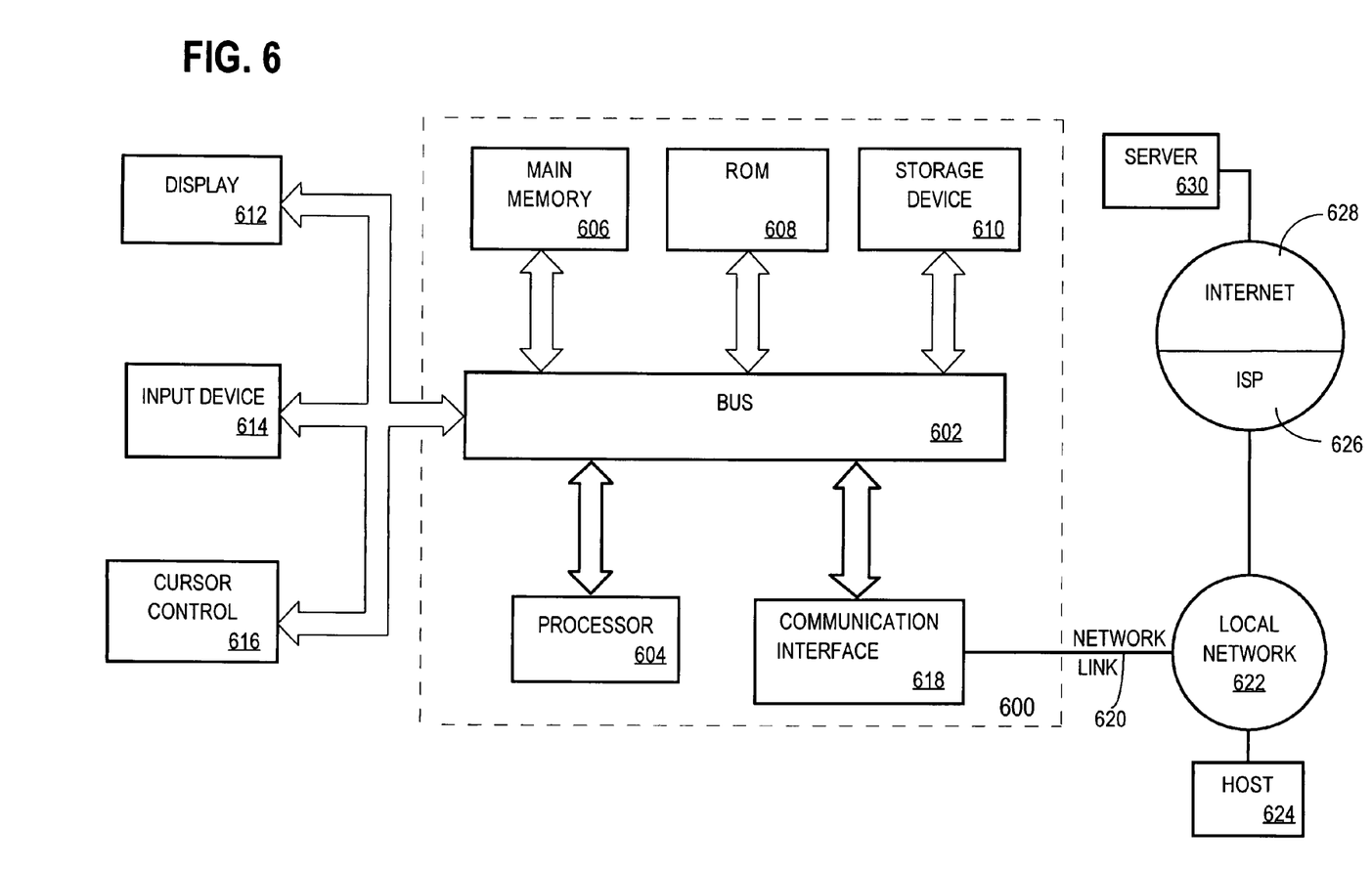
FIG. 6 is a block diagram of a computer system used to illustrate an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method for generating a type representation of an XMLType instance, comprising the steps of:
   generating within a volatile or a nonvolatile memory a XMLType type tree of nodes that represents a uniform abstraction of a type structure of the XMLType instance;
   wherein the XMLType type tree of nodes is generated based on the XMLType instance and a source of data type information about the XMLType instance;
   wherein the source of data type information is separate from the XMLType instance;
   determining data type information about said XMLType instance using the XMLType type tree of nodes without using the source of data type information about the XMLType instance; and
   rewriting a query using the data type information determined about the XMLType instance without using the source of data type information about the XMLType instance;
   wherein the step of generating a XMLType type tree of nodes includes generating a parent node of one or more children nodes, the parent node corresponding to either,
      an operator node that indicates how the one or more children nodes are grouped as a sequence, choice, or permutation, or
      an aggregate node with an aggregate quantifier set to indicate a cardinality restriction on the one or more children nodes;
   wherein the method is performed by one or more computing devices.

2. The machine-implemented method of claim 1, wherein the source of data type information is one of a plurality of heterogeneous sources of data type information selected from the group consisting of an XML schema, a SQL expression tree, an XQuery query result, an XPath query result, and object type metadata.

3. The machine-implemented method of claim 1, wherein the source of data type information comprises an XML schema associated with the XMLType instance, and wherein the step of generating a XMLType type tree of nodes comprises generating as the parent node,
   a sequence operator node that represents a sequence content model construct of said XML schema,
   a choice operator node that represents a choice content model construct of said XML schema, or
   a permutation operator node that represents an all content model construct of said XML schema.

4. The machine-implemented method of claim 1, wherein the source of data type information comprises a SQL expression returning the XMLType instance.

5. The machine-implemented method of claim 4, wherein the query comprises an XPath query or an XQuery query, and wherein the step of rewriting the query comprises rewriting the query into a SQL query.

6. The machine-implemented method of claim 4, wherein the SQL expression comprises a SQL/XML function converting a SQL object type to the XMLType instance, and wherein the step of generating a XMLType type tree of nodes further comprises:
   generating a sequence operator node as the parent node, wherein the one or more children of the parent node each correspond to a member attribute of the SQL object type; and
   generating an element composite item node that corresponds to the SQL object type as a parent of the parent node.

7. The machine-implemented method of claim 4, wherein the SQL expression comprises a SQL/XML function converting a collection type to the XMLType instance, and wherein the step of generating a XMLType type tree of nodes comprises:
   generating an aggregate node as the parent node, wherein the aggregate quantifier of the aggregate node is set to zero or more; and
   generating one child of the parent node based on the collection type.

8. The machine-implemented method of claim 4, wherein the SQL expression comprises an XMLConcat( ) SQL/XML function returning sequence option, and wherein the step of generating a XMLType type tree of nodes further comprises:
   generating a sequence operator node as the parent node; and
   generating one or more descendant nodes as descendants of the parent node, wherein the one or more descendant nodes are generated based on input SQL expressions to the XMLConcat( ) function.

9. The machine-implemented method of claim 4, wherein the SQL expression comprises a XMLConcat( ) SQL/XML function returning content option, and wherein the step of generating a XMLType type tree of nodes further comprises:
   generating a document composite item node; and
   generating one or more descendant nodes as descendants of the document composite item node, wherein the one or more descendant nodes are generated based on input SQL expressions to the XMLConcat( ) function.

10. The machine-implemented method of claim 4, wherein the SQL expression comprises an XMLAgg( ) SQL/XML function returning sequence option, and wherein the step of generating a XMLType type tree of nodes further comprises:

generating an aggregate node as the parent node, wherein the aggregate quantifier of the aggregate node is set to zero or more; and generating one or more descendant nodes as descendants of the parent node, wherein the one or more descendant nodes are generated based on input SQL expressions to the XMLAgg( ) function.

11. The machine-implemented method of claim 4, wherein the SQL expression comprises an XMLAgg( ) SQL/XML function returning content option, and wherein the step of generating a XMLType type tree of nodes further comprises:

generating a document composite item node;

generating an aggregate node as the parent node and as a child of the document composite item node, wherein the aggregate quantifier of the aggregate node is set to zero or more; and generating one or more descendant nodes as descendants of the aggregate node, wherein the one or more descendant nodes are generated based on input SQL expressions to the XMLAgg( ) function.

12. The machine-implemented method of claim 4, wherein the SQL expression comprises a SQL CASE function, and wherein the step of generating a XMLType type tree of nodes comprises:

generating a choice operator node as the parent node, wherein each of the one or more children of the parent node correspond to a branch of the SQL CASE function.

13. The machine-implemented method of claim 4, wherein the SQL expression comprises an XMLQuery( ) function embedding an XPath expression, and wherein the source of data type information comprises information obtained from performing a data typing analysis on the XPath expression.

14. The machine-implemented method of claim 4, wherein the SQL expression comprises a SQL/XML function embedding an XQuery expression, and wherein the source of data type information comprises information obtained from performing a data typing analysis on the XQuery expression.

15. The machine-implemented method of claim 4, wherein the SQL expression comprises an SQL/XML function returning the XMLType instance whose type structure is unknown during query compile time, and wherein the step of generating a XMLType type tree of nodes further comprises:

generating an aggregate operator node as the parent node, wherein the aggregate quantifier of the aggregate node is set to zero or more; and generating a choice operator node as a child of the aggregate node; and generating one or more children nodes of the choice operator node.

16. The machine-implemented method of claim 1, wherein:

the XMLType type tree of nodes contains a first subset of one or more nodes; and generating based on one or more rules that define equivalent sets of nodes, another XMLType type tree of nodes that include in lieu of the first subset of nodes, a second subset of one or more nodes that are the equivalent to the first subset of one or more nodes.

17. The machine-implemented method of claim 16, wherein the one or more rules include at least one rule from a set of algebra rules that include:

(1) empty*=empty,
(2) empty?=empty,
(3) empty+=empty, and
(4) (T1, . . . , empty, . . Tn)=(T1, . . . , Tn).

18. The machine-implemented method of claim 16, wherein the one or more rules include at least one rule from a set of algebra rules that include:

(1) (T1|T1)*=T1*|T2*,
(2) (T1|T2)?=T1?|T2?, and
(3) (T1|T2)+=T1+|T2+.

19. The machine-implemented method of claim 16, wherein the one or more rules include at least one rule from a set of algebra rules that include:

(1) (T*)*=T*,
(2) (T*)?=T*,
(3) (T*)+=T*,
(4) (T?)?=T,
(5) (T?)?=T*,
(6) (T?)+=T*,
(7) (T+)?=T*,
(8) (T+)+=T+, and
(9) (T+)*=T*.

20. The machine-implemented method of claim 16, wherein the one or more rules include at least one rule from a set of algebra rules that include:

(1) T1&T2=(T1, T2)|(T2, T1),
(2) T|T=T, and
(3) T&T=T, T.

21. The machine-implemented method of claim 16, wherein the one or more rules include at least one rule from a set of algebra rules that include:

(1) T?=empty|T, and
(2) T*=empty|T+.

22. A computer-readable storage medium storing instructions for generating a type representation of an XMLType instance, the instructions, when executed by one or more computing devices, cause the one or more computing devices to perform the steps of:

generating within a volatile or a nonvolatile memory a XMLType type tree of nodes that represents a uniform abstraction of a type structure of the XMLType instance;

wherein the XMLType type tree of nodes is generated based on the XMLType instance and a source of data type information about the XMLType instance;

wherein the source of data type information is separate from the XMLType instance;

determining data type information about said XMLType instance using the XMLType type tree of nodes without using the source of data type information about the XMLType instance; and rewriting a query using the data type information determined about the XMLType instance without using the source of data type information about the XMLType instance;

wherein the step of generating a XMLType type tree of nodes includes generating a parent node of one or more children nodes, the parent node corresponding to either, an operator node that indicates how the one or more children nodes are grouped as a sequence, choice, or permutation, or an aggregate node with an aggregate quantifier set to indicate a cardinality restriction on the one or more children nodes.

23. The computer-readable storage medium of claim 22, wherein the source of data type information is one of a plurality of heterogeneous sources of data type information selected from the group consisting of an XML schema, a SQL expression tree, an XQuery query result, an XPath query result, and object type metadata.

24. The computer-readable storage medium of claim 22, wherein the source of data type information comprises an XML schema associated with the XMLType instance, and wherein the step of generating a XMLType type tree of nodes comprises generating as the parent node,
- a sequence operator node that represents a sequence content model construct of said XML schema,
- a choice operator node that represents a choice content model construct of said XML schema, or
- a permutation operator node that represents an all content model construct of said XML schema.

25. The computer-readable storage medium of claim 22, wherein the source of data type information comprises a SQL expression returning the XMLType instance.

26. The computer-readable storage medium of claim 25, wherein the query comprises an XPath query or an XQuery query, and wherein the step of rewriting the query comprises rewriting the query into a SQL query.

27. The computer-readable storage medium of claim 22, wherein: the XMLType type tree of nodes contains a first subset of one or more nodes; and
- generating based on one or more rules that define equivalent sets of nodes, another XMLType type tree of nodes that include in lieu of the first subset of nodes, a second subset of one or more nodes that are the equivalent to the first subset of one or more nodes.

28. The computer-readable storage medium of claim 27, wherein the one or more rules include at least one rule from a set of algebra rules that include:

(1) empty * = empty,
(2) empty ? = empty,
(3) empty+= empty, and
(4) (Ti, .., empty, .. Tn) = (T1, .., Tn).

29. The computer-readable storage medium of claim 27, wherein the one or more rules include at least one rule from a set of algebra rules that include:

(1) (T1|T2) * = T1* | T2*,
(2) (T1|T2) ? = T1?|T2?, and
(3) (T1|T2)+ = T1 + | T2+.

30. The computer-readable storage medium of claim 27, wherein the one or more rules include at least one rule from a set of algebra rules that include:

(1) (T*) * = T*,
(2) (T*) ? = T*,
(3) (T*)+ = T*,
(4) (T?)? = T,
(5) (T?)* = T*,
(6) (T?)+ = T*,
(7) (T+)? = T*,
(8) (T+)+ = T+, and
(9) (T+)* = T*.

31. The computer-readable storage medium of claim 27, wherein the one or more rules include at least one rule from a set of algebra rules that include:

(1) T1 & T2 = (T1, T2) | (T2, T1),
(2) T | T = T, and
(3) T & T = T, T.

32. The computer-readable storage medium of claim 27, wherein the one or more rules include at least one rule from a set of algebra rules that include:

(1) T? = empty | T, and
(2) T * = empty |T+.

* * * * *

UNITED STATES PATENT AND TRADEMARK OFFICE
CERTIFICATE OF CORRECTION

PATENT NO. : 7,685,137 B2
APPLICATION NO. : 11/044472
DATED : March 23, 2010
INVENTOR(S) : Zhen Hua Liu et al.

It is certified that error appears in the above-identified patent and that said Letters Patent is hereby corrected as shown below:

In Face page, in field (56), under "Other Publications" column 2, line 2, delete "Relase" and insert -- Release --, therefor.

In column 11, line 48, delete "the the" and insert -- the --, therefor.

In column 18, line 4, in Claim 18, delete "(T1|T1 )*" and insert -- (T1|T2)* --, therefor.

In column 18, line 15, in Claim 19, delete "(T?)?=T*," and insert -- (T?)*=T*, --, therefor.

Signed and Sealed this
Fifteenth Day of March, 2011

David J. Kappos
*Director of the United States Patent and Trademark Office*